(12) United States Patent
Park et al.

(10) Patent No.: US 7,502,298 B2
(45) Date of Patent: Mar. 10, 2009

(54) OPTICAL PICKUP APPARATUS FOR OPTICAL DATA MEDIA OF DIFFERENT FORMATS AND METHOD THEREOF

(75) Inventors: Soo-han Park, Yongin-si (KR); Bong-gi Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 871 days.

(21) Appl. No.: 10/962,577

(22) Filed: Oct. 13, 2004

(65) Prior Publication Data

US 2005/0122861 A1 Jun. 9, 2005

(30) Foreign Application Priority Data

Dec. 8, 2003 (KR) .................... 10-2003-0088699

(51) Int. Cl.
*G11B 7/00* (2006.01)
(52) U.S. Cl. ............... 369/112.03; 369/112.1; 369/112.01; 369/44.11
(58) Field of Classification Search .............. None
See application file for complete search history.

(56) References Cited

U.S. PATENT DOCUMENTS

| | | | |
|---|---|---|---|
| 6,567,355 B2 * | 5/2003 | Izumi et al. | 369/44.41 |
| 6,891,147 B2 * | 5/2005 | Goto et al. | 250/216 |
| 7,206,266 B2 * | 4/2007 | Seong | 369/44.41 |
| 7,215,609 B2 * | 5/2007 | Shimano et al. | 369/44.37 |
| 7,283,440 B2 * | 10/2007 | Kim et al. | 369/44.38 |

FOREIGN PATENT DOCUMENTS

| | | |
|---|---|---|
| JP | 2002-216372 | 8/2002 |
| JP | 2002-28854 | 10/2002 |
| JP | 2002-318306 | 10/2002 |
| JP | 2003-006891 | 1/2003 |
| JP | 2003-014916 | 1/2003 |
| JP | 2003-030892 | 1/2003 |

OTHER PUBLICATIONS

Korean Intellectual Property Office Official Action, dated Oct. 27, 2005.

* cited by examiner

*Primary Examiner*—Muhammad N. Edun
(74) *Attorney, Agent, or Firm*—Roylance, Abrams, Berdo & Goodman, L.L.P.

(57) ABSTRACT

An optical pickup apparatus for reading and writing information from and to optical data media in different formats and a method thereof are provided. The optical pickup apparatus comprises a twin laser diode (Twin LD), a diffraction element for dividing a laser beam incident on a data medium into five beams, and an optical detector for focusing a laser beam reflected from the data medium to detect an information signal and signals for carrying out servo controls. The divided beams are focused on a predetermined location in based on a data medium format, and the beam reflected from the data medium is received on and detected from the corresponding photodiodes of the optical detector so that a focus error signal and a tracking error signal are generated.

24 Claims, 9 Drawing Sheets

# OPTICAL PICKUP APPARATUS FOR OPTICAL DATA MEDIA OF DIFFERENT FORMATS AND METHOD THEREOF

PRIORITY

This application claims the benefit under 35 U.S.C. § 119 (a) from Korean Patent Application No. 2003-88699, filed on Dec. 8, 2003, the entire content of which is incorporated herein by reference.

BACKGROUND OF THE INVENTION

1. Field of the Invention

The present invention relates to an optical pickup apparatus. More particularly, present invention relates to an optical pickup apparatus using a diffraction element having diffraction gratings formed on both sides thereof in different structures to read and write information from and to optical data media of different formats and a method thereof.

2. Description of the Related Art

The optical pickup apparatus has been used in compact disc players (CDPs), digital versatile disc or digital video disk players (DVDPs), CD-ROM drives, DVD-ROM drives to write and read information to and from an optical data media in a non-contact manner. As the optical pickup apparatus writes data to an optical disc, the optical pickup apparatus emits a laser beam onto the surface of the optical disc to form a pitch. As the optical pickup apparatus reads the written data, the optical pickup apparatus optically reads data from the pitch formed in the optical disc, and outputs an electrical signal.

The optical pickup apparatus in a DVD player that uses high-density DVDs has to be able to read and write information from and to compact discs (CDs) and CD-Recordables (CD-Rs), for compatibility, in addition to the DVDs.

However, the thickness of a DVD is standardized differently from that of a CD in structural aspects such as a disc tilt tolerance error, the number of openings for objective lenses, and so on. The CD has a thickness of 1.2 mm, whereas the DVD has a thickness of 0.6 mm. Further, in terms of standards for writing, a 780 nm wavelength beam is used for CDs, whereas a 650 nm wavelength beam is used for DVDs. Thus, general CD players cannot write information to a DVD due to such a difference, so it is necessary to develop an optical pickup apparatus for DVDs that can be also used for existing CDs.

FIG. 1 is a diagram illustrating a conventional optical pickup apparatus for optical data media of different formats. Referring to FIG. 1, the conventional optical pickup apparatus has an optical module 10 formed with a first light source 11 and a first monitor optical detector 13 incorporated, a second light source 20, a second monitor optical detector 21 for adjusting the amount of light from a beam emitted from the second light source when reading and writing information, a half wavelength plate 25 for converting a p-polarized beam emitted from the second light source into an s-polarized beam, a combination prism 30 as a polarization beam splitter for changing the traveling paths of beams respectively emitted from the first and second light sources, a collimating lens 40 for converting the beams respectively emitted from the first and second light sources into parallel lights, a reflective mirror 45 for reflecting incident beams, a polarization hologram device 50 for splitting the beam traveling onto a disc 100 into plural beams, an objective lens 60 for focusing the split incident beams onto the disc 100, and an optical detector 80 for receiving beams reflected from the disc 100 and passing through the combination prism 30. If any of the first and second light sources is activated, the first light source emitting a 780 nm wavelength beam is used for CDs, and the second light source emitting a 650 nm wavelength beam is used for DVDs.

The polarization hologram device 50 is formed to work with a p-polarized beam of 650 nm wavelength. Further, a quarter wavelength plate is formed on one side of the polarization hologram device 50 facing the disc 100 to convert the incident s-polarized beam into a circularly polarized beam and convert the reflected beam from the disc 100 into the p-polarized beam. Accordingly, only the 650 nm wavelength beam reflected from the disc 100 is split into 10 beams by the polarization hologram device 50.

The third optical detector 80 receives the 10 split beams, and obtains data information and error information from the disc 100. The optical detector 80 has a plurality of sensors for detecting the incident beam that has been reflected from a DVD, and one sensor for detecting the incident beam that has been reflected from a CD.

As described above, the conventional optical pickup apparatus has to use the polarization hologram device 50 as a beam splitter specifically designed to write information to optical data media of different formats. Such a hologram device is not structured thick due to limitation to its weight and size, so it has a thickness of 0.68 mm. The thin hologram device has a disadvantage in that it bends or twists at high temperatures, causing optical signal errors.

Further, the conventional optical pickup apparatus is designed to enhance signal-writing operations (writing and reading) at a high temperature since it uses the combination prism 30 along the optical axes of the beams of different wavelengths as well as uses the same collimating lens 40 to form a simplified optical structure, but it is difficult to manufacture the combination prism 30, and advanced technologies are needed to assemble the combination prism 30. Further, the use of the polarization hologram device 50 causes difficulties in reducing assembly tolerance between the objective lens 60 and the polarization hologram device 50, difficulties exist in pickup calibrations due to the splitting of a beam into 10 beams, and the use of two laser diodes causes an optical axis error between the two beams. As stated above, the conventional optical pickup apparatus has a disadvantage of increased defects due to its complicated structure and poor assembly due to having lots of parts.

Further, the conventional optical pickup apparatus operates at a relatively high temperature since the power required for a laser to write data to a DVD is higher than that for writing to CDs. The parts in the pickup head are attached by ultraviolet bonding. Therefore, the attached portions are twisted or expanded at a high temperature. Thus, such deformities cause a beam passing through or reflecting from the parts to deviate from the optical detector, which degrades the signal writing operations at a high temperature. In order to compensate for such a disadvantage, non-essential parts need to be eliminated, or the number of split beams reaching the optical detector should be minimized.

SUMMARY OF THE INVENTION

The present invention has been developed in order to solve the above drawbacks and other problems associated with the conventional arrangement. An aspect of the present invention is to provide an optical pickup apparatus and method employing a diffraction element formed on both sides thereof in different pitches to simplify an optical structure thereof, and enhancing signal-writing operations to optical data media of different formats even at a high temperature.

The forgoing and other objects and advantages are substantially realized by providing an optical pickup apparatus for optical data media of different formats using a twin laser diode (LD) for emitting first and second laser beams of different wavelengths to read and write information from and to a first and a second data medium. The laser beam emitted from the laser diode is diffracted in a predetermined manner by a diffraction element, divided into at least five laser beams, focused by an objective lens, and formed as optical spots on predetermined locations on the recording surface of the optical data medium. The laser beams reflected from the surface of the data medium are received on the optical detector to detect an information signal and error signals, respectively.

The first optical data medium can be a Digital Video Disk (DVD)-Read Only Memory (ROM), DVD-Random Access Memory (RAM), or DVD-Recordable/Rewritable (R/RW), and the second optical data medium can be a compact disc (CD).

The diffraction element is used to generate three beams for detecting an error for servo performance. The diffraction element used for the present invention comprises a first and a second diffraction grating formed on both sides thereof in different sizes. The first diffraction grating is formed based on a DVD-RAM standard, diffracts the first wavelength laser beam to generate the $0^{th}$ order laser beam and the $\pm 1^{st}$ laser beams. Further, the second diffraction grating is formed based on a DVD-R/RW standard, diffracts the $0^{th}$ order laser beam of the first diffraction grating, and generates another $0^{th}$ order laser beam and $\pm 1^{st}$ order beams.

Further, the optical detector for receiving the five divided laser beams comprises five photodiodes for receiving the laser beams reflected from the first optical data media and the three photodiodes for receiving the laser beams reflected from the second optical data medium.

When a hologram is disposed in front of the optical detector to correct an optical axis of a laser beam reflected from the second optical data medium and incident to the optical detector, the optical detector is structured with five photodiodes for receiving laser beams reflected and incident from the first and second optical data media.

Another optical pickup apparatus and method for optical data media of different formats according to the present invention employ two laser diodes (LDs) as light sources emitting laser beams of different wavelengths in order to read and write information from and to the first and second optical data media. Diffraction elements are disposed in front of the LDs in order to obtain three beams for servo performance from the laser beams emitted from the respective LDs. The laser beams passing through the diffraction elements are focused on an objective lens, and form optical spots on predetermined locations on the surface of a corresponding optical data medium. Further, the laser beams reflected from the surface of the optical data medium are received on the optical detector for detecting an information and error signals.

The first optical data medium can be a DVD-ROM, DVD-RAM, and DVD-R/RW, and the second optical data medium can be a CD.

The diffraction element for the DVD used to generate three beams for detecting errors for servo performance comprises the first and the second diffraction grating formed on both sides thereof in different sizes. The first diffraction grating is formed based on a DVD-RAM standard, diffracts the first wavelength laser beam, and outputs a $0^{th}$ order laser beam and $\pm 1^{st}$ order beams. Further, the second diffraction grating is formed based on a DVD-R/RW standard, diffracts the $0^{th}$ laser beam of the first diffraction grating, and outputs a $0^{th}$ order beam and $\pm 1^{st}$ order beams.

The second diffraction element diffracts the second wavelength laser beam based on a CD standard, and outputs a $0^{th}$ order laser beam and $\pm 1^{st}$ order laser beams.

Further, the optical detector comprises five photodiodes for receiving laser beams reflected and incident from the first and second optical data media.

BRIEF DESCRIPTION OF THE DRAWINGS

The above aspects and features of the present invention will be more apparent by describing certain embodiments of the present invention with reference to the accompanying drawings, in which.

Throughout the drawings, it should be noted that the same or similar elements are denoted by like reference numerals.

DETAILED DESCRIPTION OF THE PREFERRED EMBODIMENTS

Hereinafter, the present invention will now be described in detail with reference to the accompanying drawings.

Figure 1:
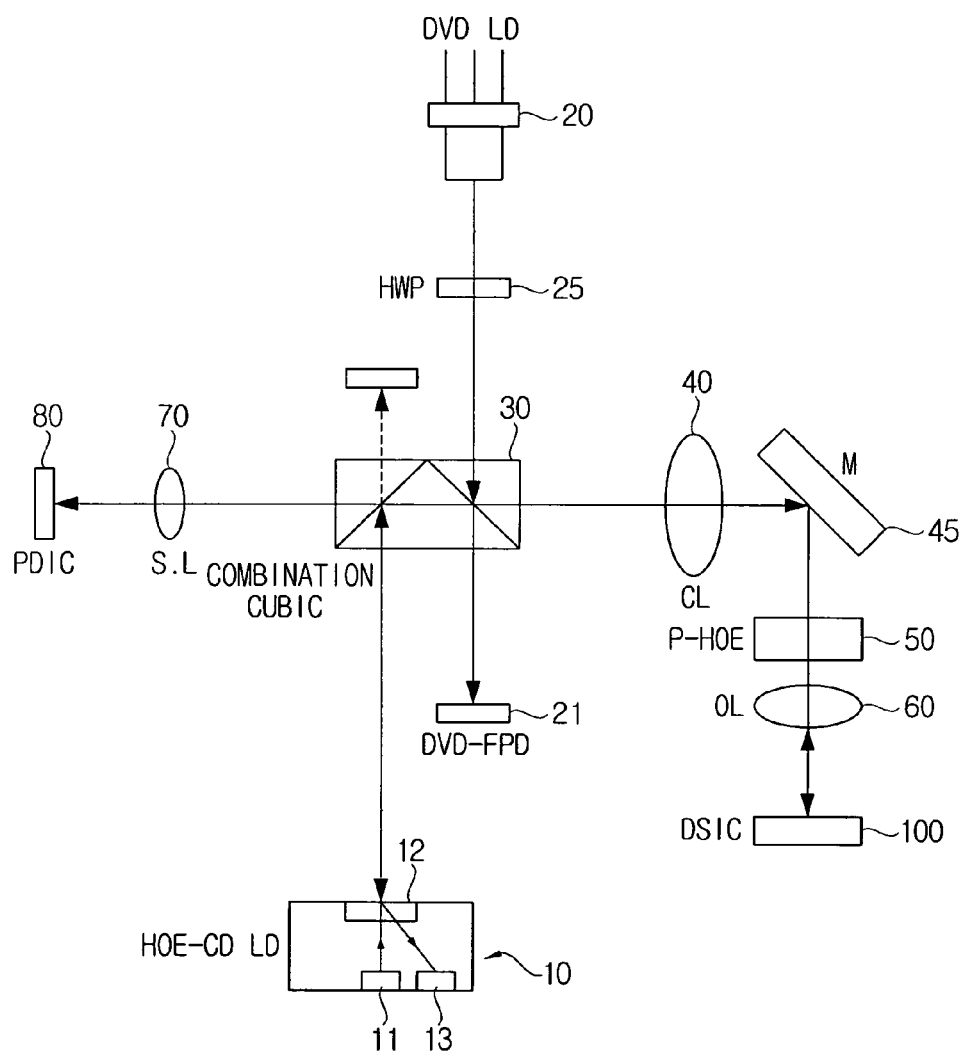
FIG. 1 is a diagram illustrating a conventional optical pickup apparatus for optical data media of different formats.
Figure 2:
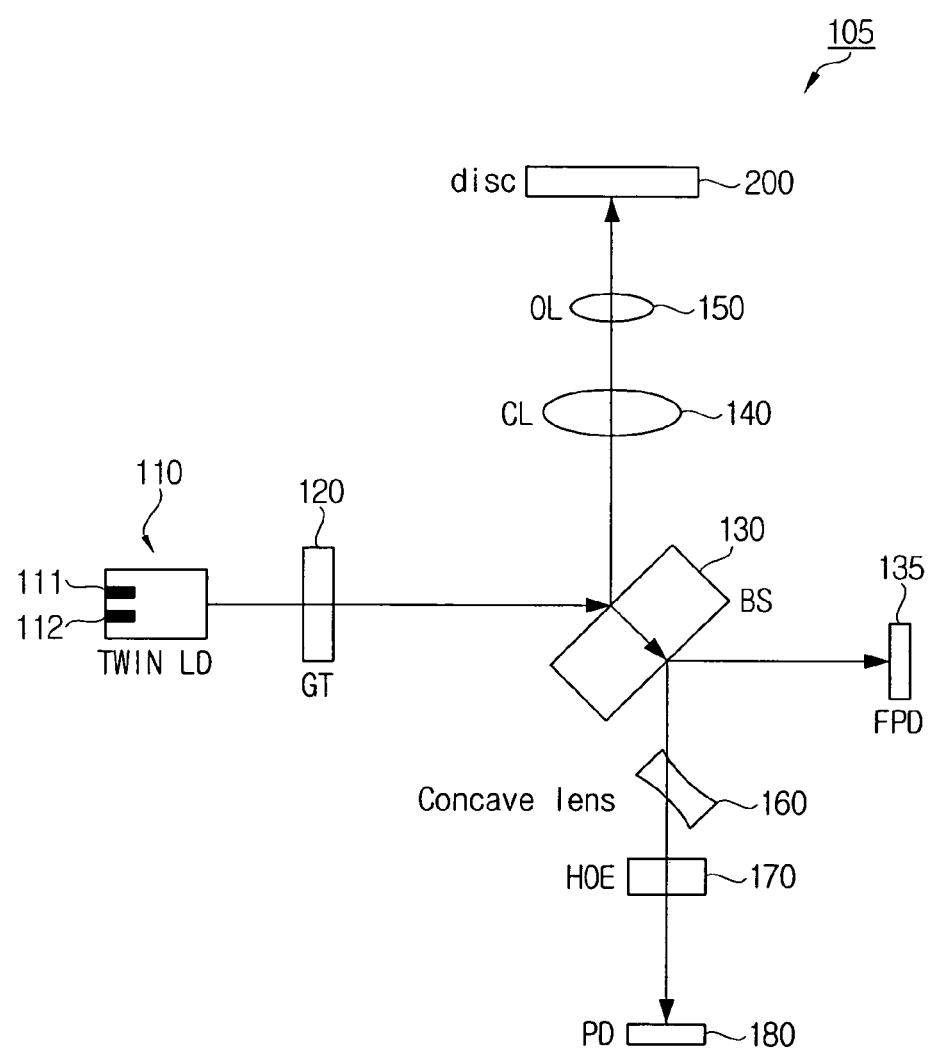
FIG. 2 is a diagram illustrating an optical pickup apparatus for reading and writing data from and to optical data media of different formats according to a first embodiment of the present invention.

FIG. 2 is a diagram illustrating an optical pickup apparatus for reading and writing data from and to optical data media of different formats according to a first embodiment of the present invention.

Referring to FIG. 2, an optical pickup apparatus 105 according to the present invention has a light source module (TWIN LD) 110, a diffraction element (GT) 120, a beam splitter (BS) 130, a monitor optical detector (FPD) 135, a collimating lens (CL) 140, an objective lens (OL) 150, a concave lens 160, a hologram (HOE) 170, and an optical detector (PD) 180.

First, the optical pickup apparatus 105 according to an embodiment of the present invention is provided in a read/write optical device (not shown) such as a compact disc player (CDP), digital video disc player (DVDP), digital video disc recorder (DVDR), and so on, writes information to an optical disc 200, and optically reads and converts the written information into an electrical signal for an output. The optical discs are optical recording media on which data is written, and classified into DVD discs such as Digital Video Disk-Recordable (DVD-R), Digital Video Disk-Recordable/Rewritable (DVD-RW), Digital Video Disk+Recordable/Rewritable (DVD+RW), Digital Video Disk-Random Access Memory (DVD-RAM), and Digital Video Disk-Read Only Memory (DVD-ROM) and Compact Disk (CD) discs such as Compact Disk-Recordable (CD-R), Compact Disk-Rewritable(CD-RW), Compact Disk-Read Only Memory (CD-ROM), but not limited to the discs listed above.

The light source module 110 is constructed with a twin laser diode (LD) having a first laser diode 111 emitting a 650 nm-wavelength laser beam and a second laser diode 112 emitting a 780 nm-wavelength laser beam. The light source module 110 activates the first LD 111 to write information onto a DVD, and activates the second LD 112 to write information onto a CD. The first and second LDs 111 and 112 are disposed about 110 µm apart, the LDs 111 and 112 emit p-polarized laser beams respectively, and are formed in order for laser beams to travel in the longitudinal axis direction and vertical to the pitch of the disc 200, which forms pitch more precisely along a track during writing since the pitch are formed along the track.

Hereinafter, a detailed description will be made on the operations of the first LD for writing information to a DVD.

Figure 3A:
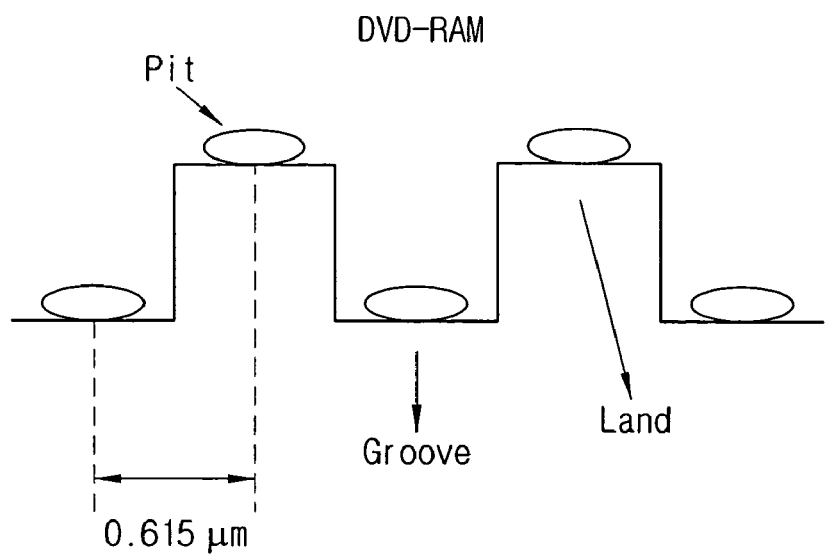
FIG. 3A is a diagram illustrating a track structure formed on a Digital Video Disk-Random Access Memory (DVD-RAM)
Figure 3B:
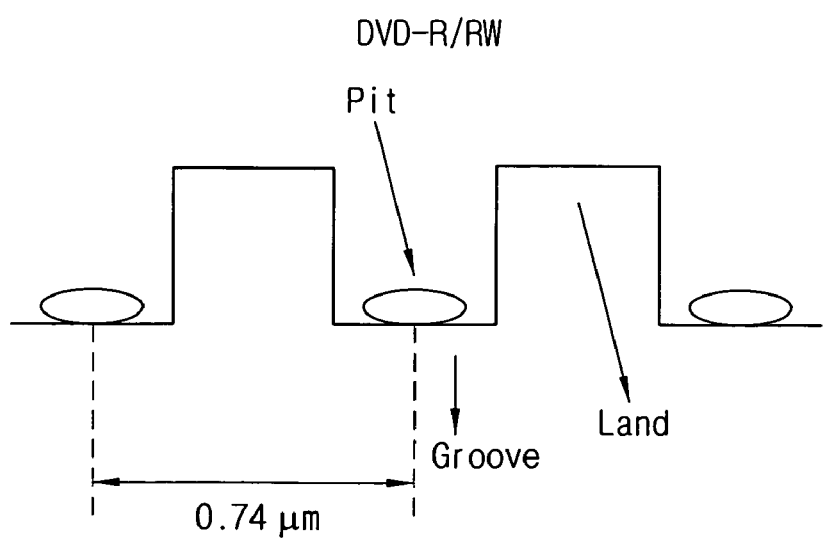
FIG. 3B is a diagram illustrating a track structure formed on a Digital Video Disk-Recordable/Rewritable (DVD-R/RW)

The DVDs have different locations of pits on which data is written and different track pitches depending on their type. FIG. 3A and FIG. 3B show track structures of a DVD-RAM and a DVD-R/RW, respectively. When information is written to the DVD-RAM, the pitch are formed on both the groove and land of a track, and a track pitch is 0.615 µm. However, when information is written to the DVD-R/RW, the pits are formed on the groove track and the track pitch is 0.74 µm. As stated above, since different DVDs have different tracks, it can be important how beams are produced to provide a tracking error (TE) signal and a focusing error (FE) signal for performing a servo when writing information. An embodiment of the present invention uses three beams to generate the tracking and focusing error signals.

Figure 4A:
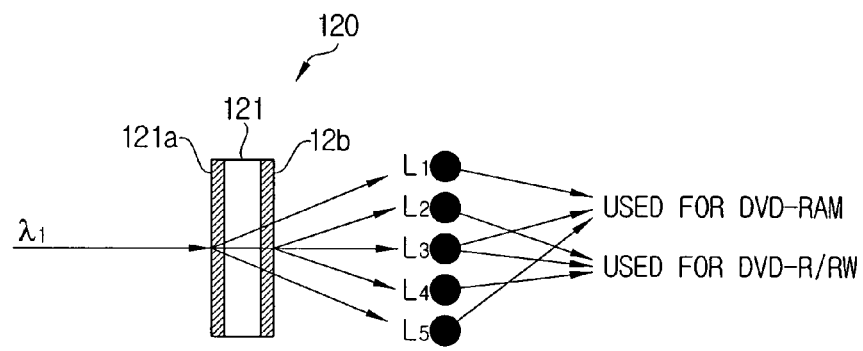
FIG. 4A is a diagram illustrating a diffraction element according to an embodiment of the present invention.

In order to obtain the three beams for generating the tracking and focusing error signals, an embodiment of the present invention uses a diffraction element 120. FIG. 4A shows the structure and operations of the diffraction element 120. Referring to FIG. 4A, the diffraction element 120 has a substrate 121, a first diffraction grating 121a formed on one side of the substrate 121 facing the light source in relation to the track pitch interval of the DVD-RAM, and a second diffraction grating 121b formed on the opposite side of the substrate 121 in relation to the track pitch of the DVD-R/RW. The first and second diffraction gratings have a different track pitch, respectively, and the respective gratings are formed to have a predetermined angle in their directions.

The first laser beam of 650 mm (λ1) wavelength emitted from the first LD 111 is split into the $0^{th}$ order laser beam and $±1^{st}$ laser beams, and the $0^{th}$ order beam is split again into the $0^{th}$ order laser beam and $1^{st}$ laser beams by the second diffraction grating 121b, so the first laser beam entering the diffraction grating 120 is split into five beams as first to fifth laser beams L1, L2, L3, L4, and L5 for the outputs of the diffraction grating 120. In here, the first, third, and fifth laser beams are used to write information to the DVD-RAM, and the second and fourth laser beams are used to write information to the DVD-R/RW.

Figure 4B:
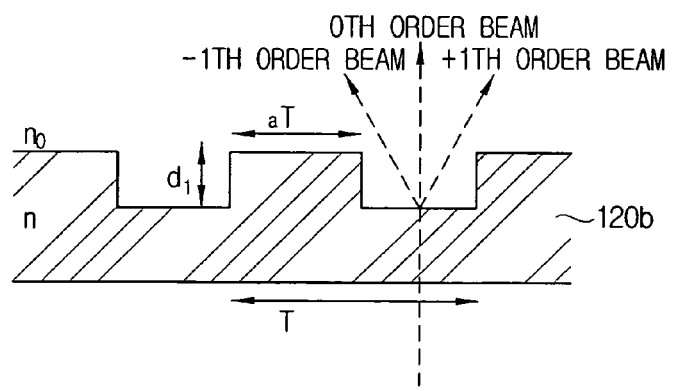
FIG. 4B is a diagram illustrating in detail diffraction gratings forming the diffraction element of FIG. 4A.

FIG. 4B is a view for showing the shape of the diffraction grating in detail. The diffraction grating is formed on the surface of glass (n=1.514) or plastic (n=1.55) in grooves of a certain depth (d) in a predetermined period (T). The intensity of a diffracted laser beam by such a diffraction grating can be expressed in Equation 1 as below:

Equation 1

$$I = \frac{4}{\pi^2 m^2}\sin^2(\pi m\alpha)\sin^2\left(\frac{\pi(n-n_0)d_1}{\lambda}\right),$$

in here, m denotes a diffraction order, n a refractive index, $d_1$ a grating groove depth, α a constant(0<α<1) determining a grating groove width, and λ a wavelength of an incident laser beam. Equation 1 shows that the intensity of the $1^{st}$ order diffraction beam compared to an incident laser beam of certain wavelength is determined based on the groove depth d and the groove width α. An embodiment of the present invention has the diffraction element 120 structured in order for the intensities of diffracted beams past through the first diffraction grating 121a and the second diffraction grating 121b to have a ratio of 1:15:1 or 1:10:1. Such a ratio can be changed depending on a structure of an optical system.

The diffraction angles of the $±1^{st}$ diffraction beams are determined according to the diffraction grating period, and the first and second diffraction gratings 121a and 121b are formed to have an appropriate grating period in order for respective diffraction beams to be incident on predetermined spots of an optical disc.

Figure 5A:
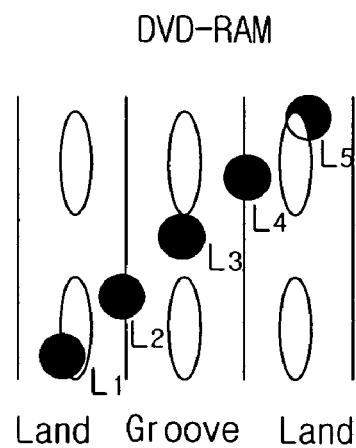
FIG. 5A is a diagram illustrating laser beam spots on the surface of a DVD-RAM.
Figure 5B:
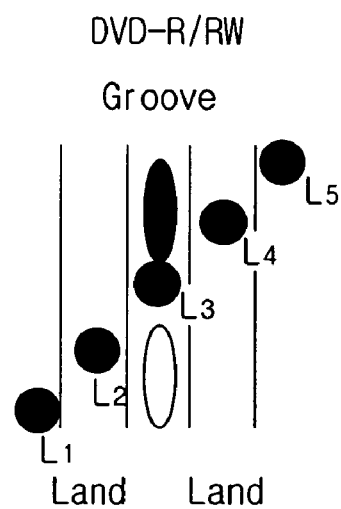
FIG. 5B is a diagram illustrating laser beam spots on the surface of a DVD-R/RW.

FIG. 5A and FIG. 5B are diagrams illustrating the first to fifth laser beams incident on the DVD that are formed by the diffraction element 120. In FIG. 5A, the first, third, and fifth laser beams are preferably focused on land, groove, and land regions of the DVD-RAM, and the second and fourth laser beams are preferably focused on land, groove, and land regions of the DVD-R/RW.

The first, third, and fifth laser beams focused on the DVD are reflected from the DVD, passed through the concave lens 160, and focused on predetermined locations on the optical detector 180. Together with collimating lens 140, the concave lens 160 controls the laser beams reflected on the DVD to be focused on the corresponding predetermined locations of the optical detector 180 in a predetermined size, and compensates for an optical length occurring due to tolerance.

The optical detector 180 comprises a kind of photodiode integrated circuits (ICs) that receives incident laser beams, generates the TE signal and the FE signal, and converts the TE signal and the FE signal into electrical signals.

Figure 6A:
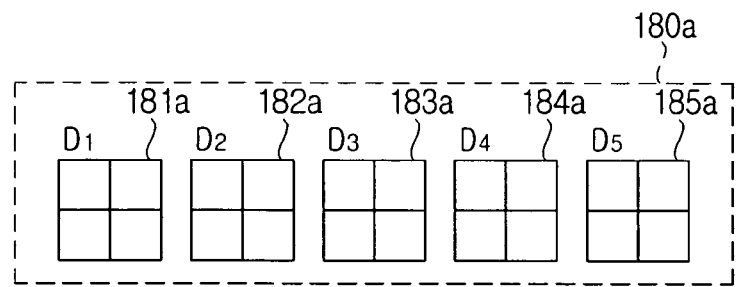
FIG. 6A is a diagram illustrating an optical detector with an optical-axis correction hologram employed according to a first embodiment of the present invention.

The optical detector 180 according to an embodiment of the present invention has a structure using three beams for reading and writing operations, and is provided with a fist photodiode ($D_1$) 181a, second photodiode ($D_2$) 182a, third photodiode ($D_3$) 183a, fourth photodiode ($D_4$) 184a, and fifth photodiode ($D_5$) 185a spatially spaced a certain distance apart, with each divided into four regions, as shown in FIG. 6A. The respective photodiodes receive the first to fifth laser beams reflected from the DVD, respectively, and the laser beams detected at the respective photodiodes of the optical detector 180 are used to generate the TE signal and the FE signal during servo performance. There are two kinds of servos, that is, a focusing servo and a tracking servo. The focusing servo controls the optical pickup apparatus to adjust laser beams for focusing onto the recording surface of a disc, whereas the tracking servo controls the optical pickup apparatus to a precise position thereof in order for the focusing not to deviate from the pitch row.

The optical disc 200 has a track pitch and thickness different depending on its type, and different optical discs require a different servo in reading and writing information therefrom and thereto. As for the DVD-ROM, the FE signal is obtained by using the astigmatism method, and the TE signal is obtained by the differential push-pull (DPP) method. The FE and TE signals can be obtained from the third laser beam detected on the third photodiode 183a.

As for the DVD-RAM, the FE signal is obtained by using the differential astigmatism method, and the TE signal is obtained by using the DPP method. The FE and TE signals can be obtained from the first, third, and fifth laser beams detected on the first, third, and fifth photodiodes 181a, 183a, and 185a.

As for the DVD-R and DVD-RW, the FE signal is obtained by using the astigmatism method, and the TE signal is obtained by using the DPP method. The FE signal is contained in the third laser beam detected on the third photodiode 183a, and the TE signal can be obtained from the second, third, and fourth laser beams detected on the second, third, and fourth photodiodes 182a, 183a, and 184a.

Figure 7:
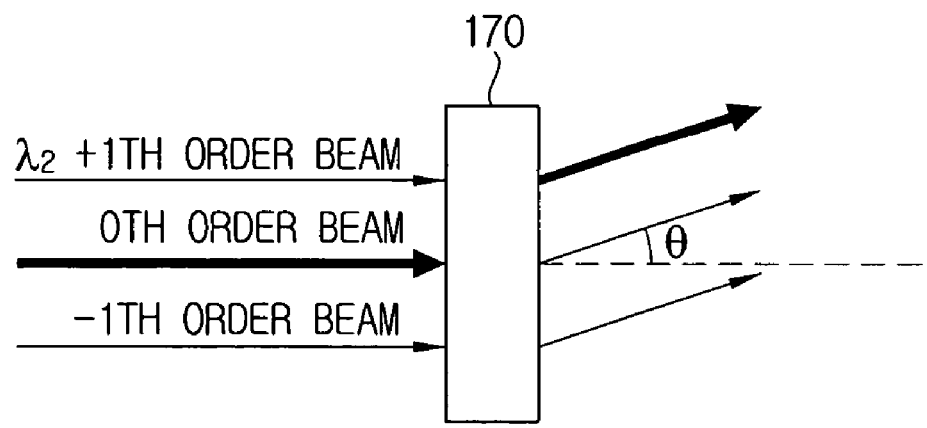
FIG. 7 is a diagram illustrating operations of an optical-axis correction hologram.
Figure 8:
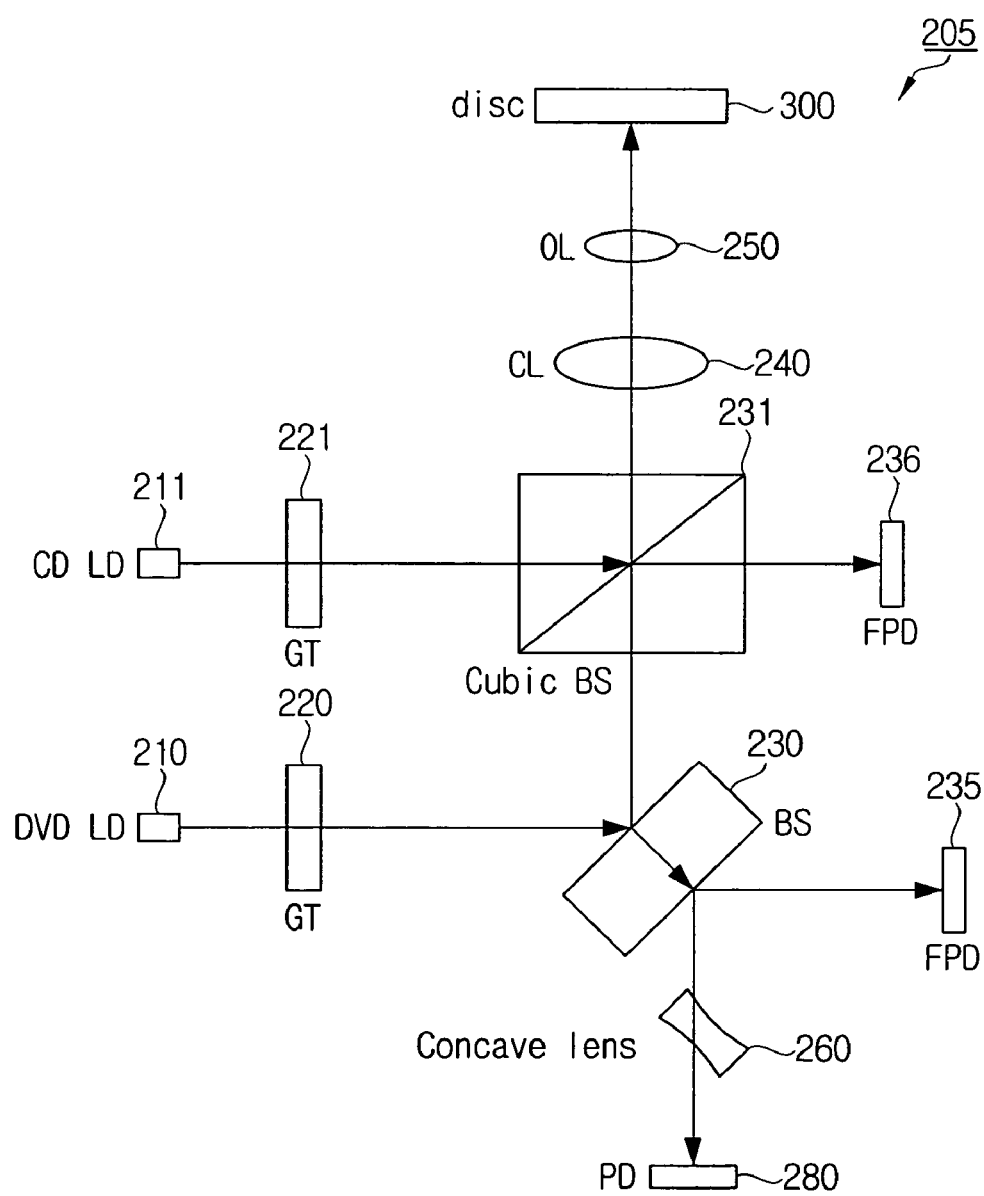
FIG. 8 is a diagram illustrating an optical pickup apparatus for reading and writing data from and to optical data media of different formats according to a second embodiment of the present invention.

In order to read and write information from and to a CD, the second wavelength beam is used, and the optical axis correction is required with respect to the second wavelength beam in order to receive a laser beam reflected from the CD since the optical system is structured along the optical axis of the first wavelength beam and the first and second light sources 111 and 112 are disposed spaced a predetermined distance apart. Thus, the hologram 170 for the optical axis correction is disposed between the concave lens 160 and the optical detector 180. The hologram 170 is not applied to the first wavelength beam as shown in FIG. 7, but to the second wavelength beam in order for the laser beams reflected from the CD to change their optical paths by a predetermined angle (θ) so as to precisely focus on the corresponding photodiodes of the optical detector 180. As for the CD, the servo controls are carried out by use of the second and fourth laser beams, and the hologram 170 works on the laser beams so that the second laser beam ($1^{st}$ order beam) has the most light amount (90%) after the laser beams have past through the hologram 170. The FE signal is obtained by use of the astigmatism method, and the TE signal is obtained by use of the push-pull method.

Figure 6B:
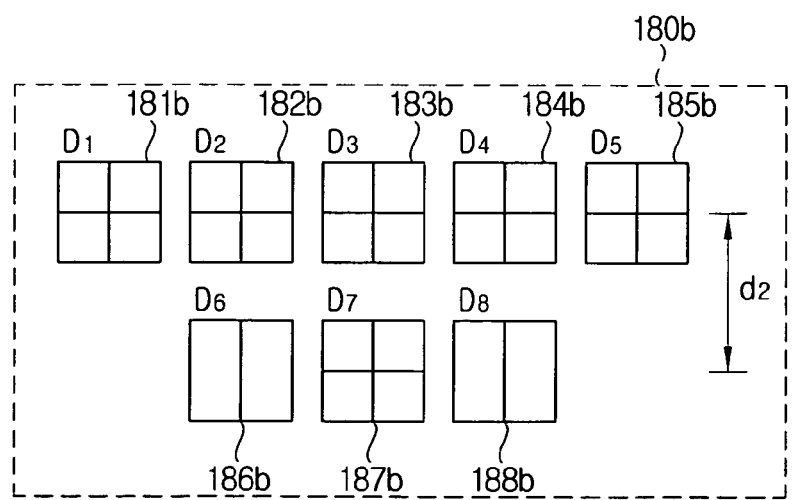
FIG. 6B is a diagram illustrating an optical detector without an optical-axis correction hologram employed according to a first embodiment of the present invention.

If the hologram 170 is not employed, as shown in FIG. 6B, the optical detector 180 has a structure having an array of five photodiodes 181b, 182b, 183b, 184b, and 185b for the DVD each of which is divided into four regions and an array of three photodiodes 186b, 187b, and 188b for the CD that is disposed spaced a predetermined distance $d_2$ apart.

An optical pickup apparatus 205 for writing data to optical data media of different formats according to a second embodiment of the present invention has a first LD 210 for emitting a first wavelength (650 nm) beam, a second LD 211 for emitting a second wavelength (780 nm) beam, diffraction elements 220 and 221 for splitting the first and second wavelength beams into the predetermined number of laser beams respectively, a beam splitter 230 for partially passing the incident laser beams of first wavelength and reflecting the rest of the laser beams to an optical disc 300, a cubic beam splitter 231 for partially passing the incident laser beams of second wavelength and reflecting the rest of the laser beams to the optical disc 300, a first monitor optical detector (FPD) 235 for receiving the first wavelength laser beams passed through the beam splitter 230 to control the first light source, a second monitor optical detector (FPD) 236 for receiving the second wavelength laser beams, a collimating lens (CL) 240 for converting the first and second wavelength laser beams reflected from the beam splitter 230 and the cubic beam splitter 231 into parallel beams, an objective lens (OL) 250 for focusing the first and second wavelength laser beams on predetermined spots onto the recording surface of the optical disc 300, an optical detector 280 for receiving the first and second laser beams reflected from the optical disc, and a concave lens 260 for adjusting the laser beams to be precisely focused on the predetermined spots on the optical detector 280.

The first diffraction element 220 has the same structure as the diffraction element 120 shown in the first embodiment, but the grating period and the grating groove depth and width can be somewhat different in structure due to the differences of the optical system structure and the optical paths.

Further, the second diffraction element 221 is structured to have the diffraction gratings formed on either its front side or rear side to obtain three second wavelength laser beams.

Figure 9:
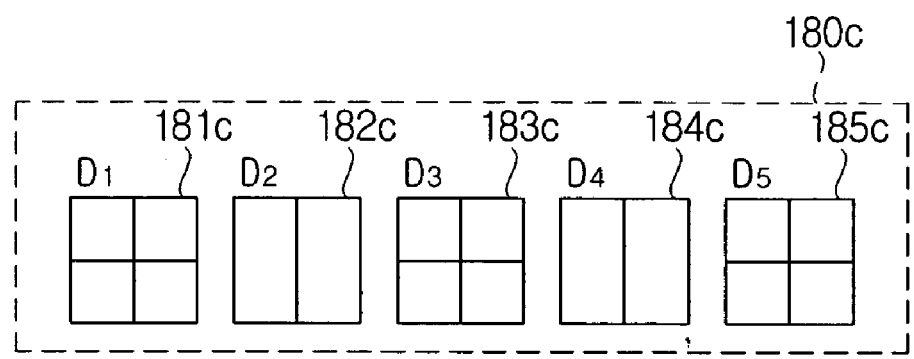
FIG. 9 is a view diagram illustrating an optical detector employed according to the second embodiment of the present invention.

FIG. 9 is a diagram illustrating a structure of the optical detector 280. Referring to FIG. 9, the optical detector 280 has five photodiodes ($D_1$, $D_2$, $D_3$, $D_4$, and $D_5$) 181c, 182c, 183c, 184c, and 185c, and the photodiodes $D_1$, $D_3$, and $D_5$ are each divided into four regions, whereas the photodiodes $D_2$ and $D_4$ are each divided into two regions. The astigmatism method and the DPP method are used to generate the FE signal and the TE signal.

As aforementioned, an embodiment of the present invention can read and write information from and to DVDs and CDs of different formats by obtaining three beams for performing a servo operation in use of the grating elements each having diffraction gratings formed in different sizes on both surfaces of the grating element. Further, an embodiment of the present invention can correct the deviations of the optical axes for the DVDs and CDs by use of the light source module having the first and second light sources, facilitate its assembly and adjustment due to its simplified structure, reduce its manufacturing cost, and enhance its signal-writing operations at a high temperature.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. An optical pickup apparatus for optical data media of different formats, comprising:
   a light source module having a first light source for emitting a first wavelength laser beam for writing information to a first data medium and a second light source for emitting a second wavelength laser beam for writing information to a second data medium, and for operating either the first light source or the second light source;
   a diffraction element comprising diffraction gratings for diffracting a laser beam emitted from either the first or the second light source in a predetermined condition, and dividing the emitted laser beam into five laser beams;

an objective lens for focusing as optical spots the laser beams passed through the diffraction gratings on predetermined locations on the surface of the corresponding data medium; and an optical detector for receiving laser beams reflected from the surface of the data media, and detecting an information signal and error signals;

wherein the diffraction gratings comprise a first diffraction grating formed to face the light source module and a second diffraction grating formed on the opposite side of the first diffraction grating, the gratings formed to have a predetermined grating period.

2. The optical pickup apparatus as claimed in claim 1, wherein the first data medium comprises a Digital Video Disk-Read Only Memory (DVD-ROM), Digital Video Disk-Random Access Memory (DVD-RAM), or Digital Video Disk-Recordable/Rewritable(DVD-R/RW), and the second data medium is a compact disk (CD).

3. The optical pickup apparatus as claimed in claim 2, wherein the first diffraction grating diffracts the first wavelength laser beam based on a DVD-RAM standard to generate a $0^{th}$ order laser beam and $\pm 1^{st}$ order laser beams, so as to generate three beams for detecting errors, and the second diffraction grating diffracts the $0^{th}$ order laser beam of the first diffraction grating based on a DVD-R/RW standard to generate a $0^{th}$ order beam and $\pm 1^{st}$ order beams, to thereby generate three beams for detecting errors.

4. The optical pickup apparatus as claimed in claim 3, wherein the optical detector comprises five photodiodes for receiving the first wavelength laser beam reflected from the first data medium and three photodiodes for receiving the second wavelength laser beam reflected from the second data medium.

5. The optical pickup apparatus as claimed in claim 3, further comprising:

a hologram disposed in front of the optical detector in order to correct an optical axis of the second wavelength laser beam reflected from the second data medium and incident on the optical detector.

6. The optical pickup apparatus as claimed in claim 5, wherein the optical detector comprises five photodiodes for receiving the laser beams reflected from the first and second data media.

7. An optical pickup apparatus for optical data media of different formats, comprising:

a light source module having a first light source for emitting a first wavelength laser beam for reading information from a first data medium and a second light source for emitting a second wavelength laser beam for reading information from a second data medium, and for operating either the first light source or the second light source;

a diffraction element comprising diffraction gratings for diffracting a laser beam emitted from either the first or the second light source in a predetermined condition, and dividing the emitted laser beam into five laser beams;

an objective lens for focusing as optical spots the laser beams passed through diffraction gratings on predetermined locations on the surface of the corresponding data medium; and an optical detector for receiving laser beams reflected from the surface of the data media, and detecting an information signal and error signals;

wherein the diffraction gratings comprise a first diffraction grating formed to face the light source module and a second diffraction grating formed on the opposite side of the first diffraction grating, the gratings formed to have a predetermined grating period.

8. The optical pickup apparatus as claimed in claim 7, wherein the first data medium comprises a Digital Video Disk-Read Only Memory (DVD-ROM), Digital Video Disk-Random Access Memory (DVD-RAM), or Digital Video Disk-Recordable/Rewritable (DVD-R/RW), and the second data medium is a compact disk (CD).

9. The optical pickup apparatus as claimed in claim 8, wherein the first diffraction grating diffracts the first wavelength laser beam based on a DVD-RAM standard to generate a $0^{th}$ order laser beam and $\pm 1^{st}$ order laser beams, so as to generate three beams for detecting errors, and the second diffraction grating diffracts the $0^{th}$ order laser beam of the first diffraction grating based on a DVD-R/RW standard to generate a $0^{th}$ order beam and $\pm 1^{st}$ order beams, so as to generate three beams for detecting errors.

10. The optical pickup apparatus as claimed in claim 9, wherein the optical detector comprises five photodiodes for receiving the first wavelength laser beam reflected from the first data medium and three photodiodes for receiving the second wavelength laser beam reflected from the second data medium.

11. The optical pickup apparatus as claimed in claim 9, further comprising:

a hologram disposed in front of the optical detector in order to correct an optical axis of the second wavelength laser beam reflected from the second data medium and incident on the optical detector.

12. The optical pickup apparatus as claimed in claim 11, wherein the optical detector comprises five photodiodes for receiving the laser beams reflected from the first and second data media.

13. An optical pickup apparatus for optical data media of different formats, comprising:

a first light source for emitting a first wavelength laser beam for writing information to a first data medium;

a second light source for emitting a second wavelength laser beam for writing information to a second data medium;

a first diffraction element for diffracting the laser beam of the first light source in a predetermined condition, and dividing the diffracted laser beam into at least five laser beams;

a second diffraction element for diffracting the laser beam of the second light source in a predetermined condition, and dividing the diffracted laser beam into at least three laser beams;

an objective lens for focusing as beam spots the laser beams passed through the first and second diffraction elements on predetermined locations on the surface of a corresponding data medium; and an optical detector for receiving the laser beams reflected from the surface of the data medium to detect an information signal and error signals;

wherein the first diffraction element comprises a first diffraction grating formed to face the light source module and a second diffraction grating formed on the opposite side of the first diffraction grating, the gratings formed to have a predetermined grating period.

14. The optical pickup apparatus as claimed in claim 13, wherein the first data medium comprises a Digital Video Disk-Read Only Memory (DVD-ROM), Digital Video Disk-Random Access Memory (DVD-RAM), or Digital Video Disk-Recordable/Rewritable (DVD-R/RW), and the second data medium is a compact disk (CD).

15. The optical pickup apparatus as claimed in claim 14, wherein the first diffraction grating diffracts the first wavelength laser beam based on a DVD-RAM standard to generate a $0^{th}$ order laser beam and $\pm1^{st}$ order laser beams, so as to generate three beams for detecting errors, and the second diffraction grating diffracts the $0^{th}$ order laser beam of the first diffraction grating based on a DVD-R/RW standard to generate a $0^{th}$ order beam and $\pm1^{st}$ order beams, so as to generate three beams for detecting errors.

16. The optical pickup apparatus as claimed in claim 14, wherein the second diffraction element comprises a diffraction grating formed on any of both sides thereof to diffract the second wavelength laser beam based on a CD standard and generate a $0^{th}$ order laser beam and $\pm1^{st}$ order laser beams, to thereby generate three beams for detecting errors.

17. The optical pickup apparatus as claimed in claim 13, wherein the optical detector comprises five photodiodes for receiving the laser beams reflected from the first and second data media.

18. An optical pickup apparatus for optical data media of different formats, comprising:
   a first light source for emitting a first wavelength laser beam for reading information from a first data medium;
   a second light source for emitting a second wavelength laser beam for reading information from a second data medium;
   a first diffraction element for diffracting the laser beam of the first light source in a predetermined condition, and dividing the diffracted laser beam into at least five laser beams;
   a second diffraction element for diffracting the laser beam of the second light source in a predetermined condition, and dividing the diffracted laser beam into at least three laser beams;
   an objective lens for focusing as beam spots the laser beams passed through the first and second diffraction elements on predetermined locations on the surface of a corresponding data medium; and
   an optical detector for receiving the laser beams reflected from the surface of the data medium to detect an information signal and error signals;
   wherein the first diffraction element comprises a first diffraction grating formed to face the light source module and a second diffraction grating formed on the opposite side of the first diffraction grating, the gratings formed to have a predetermined grating period.

19. The optical pickup apparatus as claimed in claim 18, wherein the first data medium comprises a Digital Video Disk-Read Only Memory (DVD-R/RW) (DVD-ROM), Digital Video Disk-Random Access Memory (DVD-RAM), or Digital Video Disk-Recordable/Rewritable (DVD-R/RW), and the second data medium is a compact disk (CD).

20. The optical pickup apparatus as claimed in claim 19, wherein the first diffraction grating diffracts the first wavelength laser beam based on a DVD-RAM standard to generate a $0^{th}$ order laser beam and $\pm1^{st}$ order laser beams, so as to generate three beams for detecting errors, and the second diffraction grating diffracts the $0^{th}$ order laser beam of the first diffraction grating based on a DVD-R/RW standard to generate a $0^{th}$ order beam and $\pm1^{st}$ order beams, so as to generate three beams for detecting errors.

21. The optical pickup apparatus as claimed in claim 19, wherein the second diffraction element comprises a diffraction grating formed on any of both sides thereof to diffract the second wavelength laser beam based on a CD standard and generate a $0^{th}$ order laser beam and $\pm1^{st}$ order laser beams, to thereby generate three beams for detecting errors.

22. The optical pickup apparatus as claimed in claim 18, wherein the optical detector comprises five photodiodes for receiving the laser beams reflected from the first and second data media.

23. A method for reading and writing information from and to optical data media of different formats, comprising:
   emitting a first wavelength laser beam for writing information to a first data medium and emitting a second wavelength laser beam for writing information to a second data medium via a light source module having and operating one of a first light source and a second light source, respectively;
   diffracting a laser beam emitted from either the first or the second light source in a predetermined condition, and dividing the emitted laser beam into five laser beams via a diffraction element comprising diffraction gratings;
   focusing as optical spots the laser beams passed through diffraction gratings on predetermined locations on the surface of the corresponding data medium via an objective lens; and
   receiving laser beams reflected from the surface of the data media, and detecting an information signal and error signals via an optical detector;
   wherein the diffraction gratings comprise a first diffraction grating formed to face the light source module and a second diffraction grating formed on the opposite side of the first diffraction grating, the gratings formed to have a predetermined grating period.

24. The method as claimed in claim 23, wherein the first data medium comprises a Digital Video Disk-Read Only Memory (DVD-ROM), Digital Video Disk-Random Access Memory (DVD-RAM), or Digital Video Disk-Recordable/ Rewritable (DVD-R/RW), and the second data medium is a compact disk (CD).

* * * * *